United States Patent
Suzuki et al.

(10) Patent No.: US 11,262,097 B2
(45) Date of Patent: Mar. 1, 2022

(54) METHOD FOR SETTING THE REFRIGERANT CHARGE AMOUNT IN AN AIR-CONDITIONING APPARATUS

(71) Applicant: Mitsubishi Electric Corporation, Tokyo (JP)

(72) Inventors: Yasuhiro Suzuki, Tokyo (JP); Takao Komai, Tokyo (JP); Akira Maeda, Tokyo (JP); Mitsuru Kawashima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 150 days.

(21) Appl. No.: 16/663,461

(22) Filed: Oct. 25, 2019

(65) Prior Publication Data

US 2020/0056802 A1 Feb. 20, 2020

Related U.S. Application Data

(62) Division of application No. 15/508,147, filed as application No. PCT/JP2015/074909 on Sep. 2, 2015, now abandoned.

(30) Foreign Application Priority Data

Nov. 18, 2014 (WO) .................. PCT/JP2014/080481

(51) Int. Cl.
*F24F 11/89* (2018.01)
*F25B 49/00* (2006.01)
(Continued)

(52) U.S. Cl.
CPC .............. *F24F 11/89* (2018.01); *F24F 11/30* (2018.01); *F24F 11/70* (2018.01); *F25B 13/00* (2013.01);
(Continued)

(58) Field of Classification Search
CPC .. F24F 11/36; F24F 11/30; F24F 11/32; F24F 2110/50; F25B 49/02; F25B 45/00
See application file for complete search history.

(56) References Cited

U.S. PATENT DOCUMENTS

| 5,899,807 A | 5/1999 | Kim et al. |
| 2002/0178738 A1 | 12/2002 | Taira et al. |

(Continued)

FOREIGN PATENT DOCUMENTS

| CN | 1329229 A | 1/2002 |
| CN | 1392944 A | 1/2003 |

(Continued)

OTHER PUBLICATIONS

BS EN 378-1:2008; British Standard: Refrigerating systems and heat pumps—Safety and environmental requirements; part 1 Basic requirements, definitions, classification, and selection criteria. (Year: 2008).*

(Continued)

*Primary Examiner* — Cassey D Bauer
(74) *Attorney, Agent, or Firm* — Posz Law Group, PLC

(57) ABSTRACT

An indoor unit includes an air-sending fan, an air inlet through which air of an indoor space is sucked in, and an air outlet located above the air inlet and through which the air sucked in through the air inlet is blown out to the indoor space. A control unit activates the air-sending fan when leakage of the refrigerant is detected. When M [kg] represents an amount of charge of the refrigerant in a refrigeration cycle, LFL [kg/m$^3$] represents a lower flammable limit of the refrigerant, A [m$^2$] represents a floor area of the indoor space, and Ho [m] represents a height of the air outlet above a floor surface of the indoor space, the amount of charge M, the lower flammable limit LFL, the floor area A, and the height Ho satisfy a relationship of M<LFL×A×Ho.

2 Claims, 10 Drawing Sheets

(51) Int. Cl.

| | | |
|---|---|---|
| *F24F 11/30* | (2018.01) | |
| *F24F 11/70* | (2018.01) | |
| *F25B 45/00* | (2006.01) | |
| *F24F 11/36* | (2018.01) | |
| *F24F 11/32* | (2018.01) | |
| *F25B 49/02* | (2006.01) | |
| *F25B 13/00* | (2006.01) | |
| *F24F 110/50* | (2018.01) | |

(52) U.S. Cl.
CPC ............ *F25B 45/00* (2013.01); *F25B 49/005* (2013.01); *F25B 49/02* (2013.01); *F24F 11/32* (2018.01); *F24F 11/36* (2018.01); *F24F 2110/50* (2018.01); *F25B 2313/0293* (2013.01); *F25B 2400/12* (2013.01); *F25B 2400/121* (2013.01); *F25B 2500/222* (2013.01)

(56) References Cited

U.S. PATENT DOCUMENTS

| | | |
|---|---|---|
| 2005/0278069 A1 | 12/2005 | Bash et al. |
| 2013/0098576 A1 | 4/2013 | Fujitaka et al. |
| 2013/0180268 A1 | 7/2013 | Schlosser |

FOREIGN PATENT DOCUMENTS

| | | | |
|---|---|---|---|
| CN | 102971596 | A | 3/2013 |
| JP | H10-103742 | A | 4/1998 |
| JP | H10-115478 | A | 5/1998 |
| JP | H11-173684 | A | 7/1999 |
| JP | 2000-234797 | A | 8/2000 |
| JP | 2002-098346 | A | 4/2002 |
| JP | 2002-372317 | A | 12/2002 |
| JP | 2004-116885 | A | 4/2004 |
| JP | 2010-025519 | A | 2/2010 |
| JP | 4599699 | B2 | 12/2010 |
| JP | 2014-035171 | A | 2/2014 |
| JP | 2014-081160 | A | 5/2014 |
| JP | 2014-142141 | A | 8/2014 |
| JP | 6033500 | B2 | 11/2016 |
| WO | 2012/073294 | A1 | 6/2012 |

OTHER PUBLICATIONS

F32 For Air Conditioning—a low GWP, low flammable solution; Air Conditioning and Heat Pump Institute; Nov. 2012 (Year: 2012).*
Osami Kataoka et al., Allowable Charge Calculation Method for Flammable Refrigerants, Eighth International Refrigeration Conference, Jul. 25-28, 2000, pp. 383-390, Purdue University, West Lafayette, IN, USA.
Office Action dated Aug. 27, 2019 issued in corresponding CN patent application No. 201580061226.5 (and English translation).
Office Action dated Sep. 24, 2019 issued in corresponding JP patent application No. 2018-206530 (and English translation).
International Search Report of the International Searching Authority dated Nov. 17, 2015 for the corresponding international application No. PCT/JP2015/074909 (and English translation).
Office Action dated Jun. 7, 2016 issued in corresponding JP patent application No. 2016-515162 (and English translation).
Office Action dated Sep. 27, 2016 issued in corresponding JP patent application No. 2016-154832 (and English translation).
Office Action dated Sep. 20, 2016 issued in corresponding JP patent application No. 2016-154833 (and English translation).
Extended EP Search Report dated Oct. 5, 2017 in corresponding EP patent application No. 15860849.7.
Office Action dated Jul. 5, 2019 issued in corresponding EP patent application No. 15 860 849.7.
Kataoka et al. "Allowable Charge Calculation Method for Flammable Refrigerants", International Refrigeration and Air Conditioning Conference, 2000.
Chinese Office Action dated Feb. 5, 2021, issued in corresponding Chinese Patent Application No. 202010068091.8 (and English Machine Translation).
D. Colbourne, et al; "Appraising the Flammability Hazards of Hydrocarbon Refrigerants Using Quantitative Risk Assessment Model," International Journal of Refrigeration, vol. 27, dated Dec. 31, 2004, 10 pages.
Summons to Attend Oral Proceedings dated Feb. 21, 2020 issued in corresponding EP patent application No. 15860849.7.

* cited by examiner

FIG. 13

| | | TYPE 50 | TYPE 56 | TYPE 63 | TYPE 80 | TYPE 112 |
|---|---|---|---|---|---|---|
| RATED CAPACITY [kW] | COOLING | 4.5 | 5.0 | 5.6 | 7.1 | 10.0 |
| | HEATING | 5.0 | 5.6 | 6.3 | 8.0 | 11.2 |
| MAXIMUM CAPACITY [kW] | COOLING | 5.0 | 5.6 | 6.3 | 8.0 | 11.2 |
| | HEATING | 6.6 | 7.3 | 8.0 | 10.8 | 14.0 |
| MINIMUM CAPACITY [kW] | COOLING | 1.8 | 1.8 | 1.8 | 2.3 | 4.3 |
| | HEATING | 1.6 | 1.6 | 1.6 | 2.0 | 3.5 |
| APPROXIMATE AIR-CONDITIONED AREA | | | | | | |
| GENERAL OFFICES | COOLING LOAD AS CALCULATION CRITERION 170 – 115 W/m² | 29 – 43 m² | 33 – 49 m² | 37 – 55 m² | 47 – 70 m² | 66 – 97 m² |
| GENERAL STORES | 230 – 155 W/m² | 22 – 32 m² | 24 – 36 m² | 27 – 41 m² | 35 – 52 m² | 49 – 72 m² |
| RESTAURANTS | 370 – 230 W/m² | 14 – 22 m² | 15 – 24 m² | 17 – 27 m² | 22 – 35 m² | 30 – 49 m² |
| CAFES, BARBERS | 290 – 230 W/m² | 17 – 22 m² | 19 – 24 m² | 22 – 27 m² | 28 – 35 m² | 39 – 49 m² |
| RESIDENTIAL HOUSES | | 25 – 36 m² | 26 – 40 m² | 29 – 43 m² | 36 – 55 m² | |
| WOODEN PREFABRICATED BUILDINGS | HEATING LOAD AS CALCULATION CRITERION 379 – 203 W/m² | 12 – 28 m² | 13 – 29 m² | 14 – 31 m² | 22 – 46 m² | 33 – 68 m² |

FIG. 14

| | REFRIG-ERANT | ALLOWED REFRIGERANT PIPE LENGTH | REFRIGERANT CHARGE AT FACTORY | AMOUNT OF REFRIGERANT ADDED FOR REFRIGERANT PIPE LENGTHS OVER 30 m | | | | |
|---|---|---|---|---|---|---|---|---|
| | | | | OVER 30 m UP TO 40 m | OVER 40 m UP TO 50 m | OVER 50 m UP TO 60 m | OVER 60 m UP TO 70 m | OVER 70 m UP TO 75 m |
| TYPES 50 TO 63 | R32 | UP TO 50 m | 2.0 kg | 0.15 kg | 0.3 kg | | | |
| TYPE 80 | R32 | UP TO 50 m | 2.8 kg | 0.4 kg | 0.8 kg | | | |
| TYPE 112 | R32 | UP TO 75 m | 4.0 kg | 0.4 kg | 0.8 kg | 1.2 kg | 1.5 kg | |

METHOD FOR SETTING THE REFRIGERANT CHARGE AMOUNT IN AN AIR-CONDITIONING APPARATUS

CROSS REFERENCE TO RELATED APPLICATIONS

The present application is a divisional application of U.S. application Ser. No. 15/508,147 filed on Mar. 2, 2017, which is a U.S. national stage application of International Patent Application No. PCT/JP2015/074909 filed on Sep. 2, 2015, which claims priority to International Patent Application No. PCT/JP2014/080481 filed on Nov. 18, 2014, the contents of which are incorporated herein by reference.

TECHNICAL FIELD

The present invention relates to an air-conditioning apparatus.

BACKGROUND ART

HFC refrigerants such as R-410A, which are non-flammable, are conventionally used for air-conditioning apparatuses. Unlike conventional HCFC refrigerants such as R-22, R-410A has a zero ozone depletion potential (to be referred to as "ODP" hereinafter), and hence does not deplete the ozone layer. However, R-410A has a high global warming potential (to be referred to as "GWP" hereinafter). Thus, as part of global warming prevention measures, studies are under way for a switch from HFC refrigerants with high GWPs, such as R-410A, to refrigerants with low GWPs.

Candidates for such refrigerants with low GWPs include HC refrigerants such as R-290 ($C_3H_8$, propane) and R-1270 ($C_3H_6$, propylene), which are natural refrigerants. However, unlike R-410A, which is non-flammable, refrigerants such as R-290 and R-1270 have high flammability (highly flammable). Thus, when R-290 or R-1270 is to be used as a refrigerant, care needs to be taken against refrigerant leaks.

Alternative candidates for refrigerants with low GWPs include HFC refrigerants with no carbon double bond in their composition, for example, R-32 ($CH_2F_2$, difluoromethane) with a GWP lower than that of R-410A.

Similar candidates for such refrigerants include halogenated hydrocarbons, which are a type of HFC refrigerants like R-32 and have carbon double bonds in their composition. Examples of such halogenated hydrocarbons include HFO-1234yf ($CF_3CF=CH_2$, tetrafluoropropene) and HFO-1234ze ($CF_3$—CH=CHF). HFC refrigerants with carbon double bonds in their composition are often expressed as "HFO" using "O" for olefin (unsaturated hydrocarbons with carbon double bonds are called olefin) to differentiate such HFC refrigerants from HFC refrigerants with no carbon double bond in their composition, such as R-32.

Although such HFC refrigerants (including HFO refrigerants) with low GWPs are not as highly flammable as HC refrigerants such as R-290, which is a natural refrigerant, unlike R-410A, which is non-flammable, these HFC refrigerants have mild flammability (mildly flammable). Thus, as with R-290, care needs to be taken against refrigerant leaks. Hereinafter, refrigerants with levels of flammability equal to or higher than mild flammability (for example, 2 L or higher in the ASHRAE-34 classification) will be referred to as "flammable refrigerants".

Leakage of flammable refrigerant into the indoor space causes indoor refrigerant concentration to increase, potentially leading to formation of a flammable concentration region.

Patent Literature 1 describes an air-conditioning apparatus using flammable refrigerant. The air-conditioning apparatus includes a refrigerant detection unit disposed on the outer surface of the indoor unit to detect flammable refrigerant, and a control unit that rotates an indoor-unit air-sending fan when the refrigerant detection unit detects refrigerant. In the air-conditioning apparatus, in situations such as when flammable refrigerant leaks into the indoor space from an extension pipe leading to the indoor unit, and when flammable refrigerant that has leaked out inside the indoor unit flows to the outside of the indoor unit through a gap in the housing of the indoor unit, the leaked refrigerant can be detected by the refrigerant detection unit. Further, when a refrigerant leak is detected, the indoor-unit air-sending fan is rotated. As a result, the indoor air is sucked in from the air inlet provided in the housing of the indoor unit, and air is blown out into the indoor space from the air outlet, thus enabling effective dispersion of the leaked refrigerant.

CITATION LIST

Patent Literature

Patent Literature 1: Japanese Patent No. 4599699

SUMMARY OF INVENTION

Technical Problem

However, the amount of refrigerant charge is not specified for the air-conditioning apparatus described in Patent Literature 1. Thus, if the amount of refrigerant charge is excessive, a flammable concentration region can form in the indoor space even when the leaked refrigerant and the indoor air are stirred by using the indoor-unit air-sending fan.

The present invention has been made to address the above-mentioned problem, and an object of the invention is to provide an air-conditioning apparatus that reduces formation of a flammable concentration region in the indoor space even when flammable refrigerant leaks accidentally.

Solution to Problem

An air-conditioning apparatus according to an embodiment of the present invention includes a refrigeration cycle through which refrigerant is circulated, an indoor unit that accommodates at least an indoor heat exchanger of the refrigeration cycle, the indoor unit being disposed in an indoor space, and a control unit that controls the indoor unit. The refrigerant is a flammable refrigerant with a density greater than a density of air under atmospheric pressure. The indoor unit includes an air-sending fan, an air inlet through which air of the indoor space is sucked in, and an air outlet located above the air inlet and through which the air sucked in through the air inlet is blown out to the indoor space. The air outlet is provided on a front face or a side face of a housing of the indoor unit. The control unit activates the air-sending fan when leakage of the refrigerant is detected. When M [kg] represents an amount of charge of the refrigerant in the refrigeration cycle, LFL [kg/m³] represents a lower flammable limit of the refrigerant, A [m²] represents a floor area of the indoor space, and Ho [m] represents a height of the air outlet above a floor surface of the indoor space, the amount of charge M, the lower flammable limit LFL, the floor area A, and the height Ho satisfy a relationship of M<LFL×A×Ho.

An air-conditioning apparatus according to an embodiment of the present invention includes a refrigeration cycle through which refrigerant is circulated, an indoor unit that accommodates at least an indoor heat exchanger of the refrigeration cycle, the indoor unit being disposed in an indoor space, and a control unit that controls the indoor unit. The refrigerant is a flammable refrigerant with a density greater than a density of air under atmospheric pressure. The indoor unit includes an air-sending fan, an air inlet through which air of the indoor space is sucked in, an air outlet located above the air inlet and through which the air sucked in through the air inlet is blown out to the indoor space, and a vertical air deflector vane located at the air outlet. The air outlet is provided on a front face or a side face of a housing of the indoor unit. When M [kg] represents an amount of charge of the refrigerant in the refrigeration cycle, LFL [kg/m$^3$] represents a lower flammable limit of the refrigerant, A [m$^2$] represents a floor area of the indoor space, and Ho [m] represents a height of the air outlet above a floor surface of the indoor space, the amount of charge M, the lower flammable limit LFL, the floor area A, and the height Ho satisfy a relationship of M≥LFL×A×Ho. The control unit activates the air-sending fan and sets the vertical air deflector vane to an upward orientation when leakage of the refrigerant is detected.

Advantageous Effects of Invention

The embodiment of the present invention reduces formation of a flammable concentration region in the indoor space even when flammable refrigerant leaks accidentally.

BRIEF DESCRIPTION OF DRAWINGS

FIG. 13 illustrates an example of items written in the catalog of the air-conditioning apparatus according to Embodiment 1 of the present invention.

FIG. 14 illustrates an example of items written in the catalog or installation manual of the air-conditioning apparatus according to Embodiment 1 of the present invention.

DESCRIPTION OF EMBODIMENTS

Embodiment 1

Figure 1:
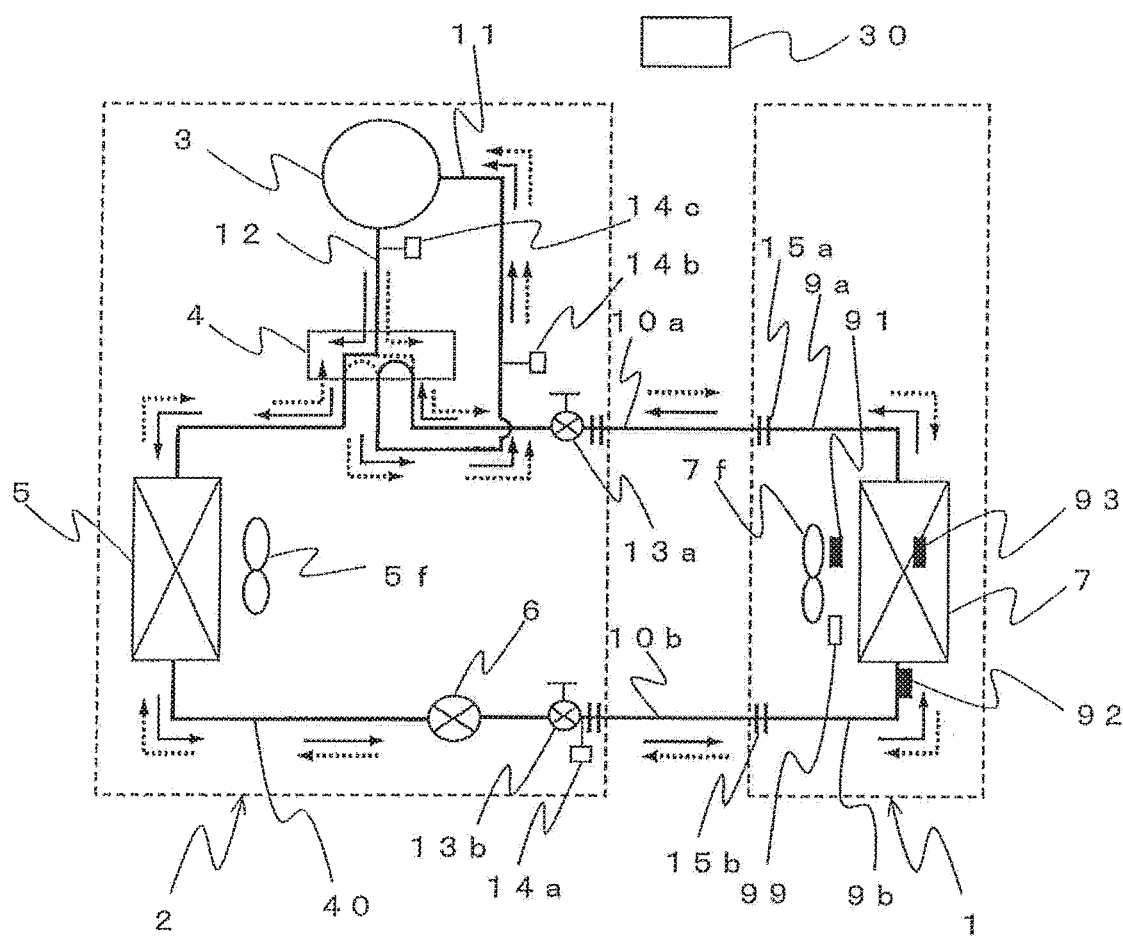
FIG. 1 is a refrigerant circuit diagram illustrating the general configuration of an air-conditioning apparatus according to Embodiment 1 of the present invention.

An air-conditioning apparatus according to Embodiment 1 of the present invention will be described. FIG. 1 is a refrigerant circuit diagram illustrating the general configuration of the air-conditioning apparatus according to Embodiment 1. In the drawings including FIG. 1, features such as the relative sizes of components and their shapes may not be to scale.

As illustrated in FIG. 1, the air-conditioning apparatus has a refrigeration cycle 40 through which refrigerant is circulated. The refrigeration cycle 40 includes a compressor 3, a refrigerant flow switching device 4, an outdoor heat exchanger 5 (heat source-side heat exchanger), a pressure reducing device 6, and an indoor heat exchanger 7 (load-side heat exchanger) that are annularly connected in the stated order by pipes. The air-conditioning apparatus further includes an indoor unit 1 that is installed indoors, for example, and an outdoor unit 2 that is installed outdoors, for example. The indoor unit 1 and the outdoor unit 2 are connected to each other by extension pipes 10a and 10b constituting part of refrigerant pipes.

Examples of refrigerant circulated through the refrigeration cycle 40 include a mildly flammable refrigerant such as R-32, HPO-1234yf, and HFO-1234ze, and a highly flammable refrigerant such as R-290 and R-1270. Each of these refrigerants may be used as a single-component refrigerant, or may be used as a refrigerant mixture that is a mixture of two or more types of refrigerant. Each of these refrigerants has a density greater than the density of air under atmospheric pressure (for example, at room temperature (25 degrees C.)).

The compressor 3 is a piece of fluid machinery that compresses low-pressure refrigerant sucked into the compressor 3, and discharges the compressed refrigerant as high-pressure refrigerant. Examples of the compressor 3 used include an inverter-driven hermetic electric compressor with adjustable rotation speed. The refrigerant flow switching device 4 switches the directions of refrigerant flow in the refrigeration cycle 40 between cooling operation and heating operation. The refrigerant flow switching device 4 used is, for example, a four-way valve. The outdoor heat exchanger 5 is a heat exchanger that acts as a radiator (for example, condenser) in cooling operation, and acts as an evaporator in heating operation. In the outdoor heat exchanger 5, heat is exchanged between the refrigerant circulated in the outdoor heat exchanger 5, and the air (outside air) sent by an outdoor air-sending fan 5f described later. The pressure reducing device 6 reduces the pressure of high-pressure refrigerant to turn the refrigerant into low-pressure refrigerant. The pressure reducing device 6 used is, for example, an electronic expansion valve with an adjustable opening degree. The indoor heat exchanger 7 is a heat exchanger that acts as an evaporator in cooling operation, and acts as a radiator (for example, condenser) in heating operation. In the indoor heat exchanger 7, heat is exchanged between the refrigerant circulated in the indoor heat exchanger 7, and the air sent by an indoor air-sending fan 7f described later. The term cooling operation refers to an operation in which low-temperature, low-pressure refrigerant is supplied to the indoor heat exchanger 7, and heating operation refers to an operation in which high-temperature, high-pressure refrigerant is supplied to the indoor heat exchanger 7.

The compressor 3, the refrigerant flow switching device 4, the outdoor heat exchanger 5, and the pressure reducing device 6 are accommodated in the outdoor unit 2. Further, the outdoor air-sending fan 5f for supplying outside air to the outdoor heat exchanger 5 is also accommodated in the outdoor unit 2. The outdoor air-sending fan 5f is placed opposite to the outdoor heat exchanger 5. Rotating the outdoor air-sending fan 5f creates a flow of air that passes through the outdoor heat exchanger 5. The outdoor air-sending fan 5f used is, for example, a propeller fan. The outdoor air-sending fan 5f is disposed downstream of the outdoor heat exchanger 5, for example, in the direction of the flow of air created by the outdoor air-sending fan 5f.

Refrigerant pipes disposed in the outdoor unit 2 include a refrigerant pipe that connects an extension-pipe connection valve 13a located on the gas side (in cooling operation) with the refrigerant flow switching device 4, a suction pipe 11 connected to the suction side of the compressor 3, a discharge pipe 12 connected to the discharge side of the compressor 3, a refrigerant pipe that connects the refrigerant flow switching device 4 with the outdoor heat exchanger 5, a refrigerant pipe that connects the outdoor heat exchanger 5 with the pressure reducing device 6, and a refrigerant pipe that connects the pressure reducing device 6 with an extension-pipe connection valve 13b located on the liquid side (in cooling operation). The extension-pipe connection valve 13a is implemented as a two-way valve capable of being switched open and close, with a flare coupling attached at its one end. The extension-pipe connection valve 13b is implemented as a three-way valve capable of being switched open and close. A service port 14a that is used during vacuuming (during an operation performed prior to filling the refrigeration cycle 40 with refrigerant) is attached at one end of the extension-pipe connection valve 13b, and a flare coupling is attached at another end.

High-temperature, high-pressure gas refrigerant compressed by the compressor 3 flows through the discharge pipe 12 during both cooling operation and heating operation. Low-temperature, low-pressure refrigerant (gas refrigerant or two-phase refrigerant) that has undergone evaporation flows through the suction pipe 11 during both cooling operation and heating operation. The suction pipe 11 is connected with a service port 14b with flare coupling on the low-pressure side, and the discharge pipe 12 is connected with a service port 14c with flare coupling on the high-pressure side. The service ports 14b and 14c are used to connect a pressure gauge to measure operating pressure during a test run made at the time of installation or repair of the air-conditioning apparatus.

The indoor heat exchanger 7 is accommodated in the indoor unit 1. Further, the indoor air-sending fan 7f for supplying air to the indoor heat exchanger 7 is installed in the indoor unit 1. Rotating the indoor air-sending fan 7f creates a flow of air that passes through the indoor heat exchanger 7. Depending on the type of the indoor unit 1, examples of the indoor air-sending fan 7f used include a centrifugal fan (for example, a sirocco fan or a turbo fan), a cross-flow fan, a mixed flow fan, and an axial flow fan (for example, a propeller fan). Although the indoor air-sending fan 7f in the present example is disposed upstream of the indoor heat exchanger 7 in the direction of the flow of air created by the indoor air-sending fan 7f, the indoor air-sending fan 7f may be disposed downstream of the indoor heat exchanger 7.

The indoor unit 1 is further provided with components such as a suction air temperature sensor 91 that detects the temperature of indoor air sucked in from the indoor space, a heat exchanger inlet temperature sensor 92 that detects the temperature of refrigerant at the location of the indoor heat exchanger 7 that becomes the inlet during cooling operation (the outlet during heating operation), and a heat exchanger temperature sensor 93 that detects the temperature (evaporating temperature or condensing temperature) of the two-phase portion of refrigerant in the indoor heat exchanger 7. Further, the indoor unit 1 is provided with a refrigerant detection unit 99 described later. These various sensors each output a detection signal to the control unit 30 that controls the indoor unit 1 or the entire air-conditioning apparatus.

Among the refrigerant pipes of the indoor unit 1, an indoor pipe 9a on the gas side is provided with a coupling 15a (for example, a flare coupling) located at its connection with the extension pipe 10a on the gas side, to connect the extension pipe 10a. Further, among the refrigerant pipes of the indoor unit 1, an indoor pipe 9b on the liquid side is provided with a coupling 15b (for example, a flare coupling) located at its connection with the extension pipe 10b on the liquid side, to connect the extension pipe 10b.

The control unit 30 has a microcomputer including components such as a CPU, a ROM, a RAM, and an input-output port. The control unit 30 is capable of mutually communicating data with an operating unit 26 described later. The control unit 30 in the present example controls the operation of the indoor unit 1 or the entire air-conditioning apparatus including the operation of the indoor air-sending fan 7f, based on signals such as an operational signal from the operating unit 26 and detection signals from various sensors. The control unit 30 may be provided inside the housing of the indoor unit 1, or may be provided inside the housing of the outdoor unit 2. Further, the control unit 30 may include an outdoor-unit control unit disposed in the outdoor unit 2, and an indoor-unit control unit disposed in the indoor unit 1 and capable of data communication with the outdoor-unit control unit.

Next, operation of the refrigeration cycle 40 of the air-conditioning apparatus will be described. First, cooling operation will be described. In FIG. 1, solid arrows indicate the flow of refrigerant in cooling operation. In cooling operation, the refrigerant circuit is configured so that the flow path of refrigerant is switched by the refrigerant flow switching device 4 as indicated by the solid arrows, causing low-temperature, low-pressure refrigerant to flow to the indoor heat exchanger 7.

High-temperature, high-pressure gas refrigerant discharged from the compressor 3 first enters the outdoor heat exchanger 5 via the refrigerant flow switching device 4. In cooling operation, the outdoor heat exchanger 5 acts as a condenser. That is, in the outdoor heat exchanger 5, heat is exchanged between the refrigerant circulated in the outdoor heat exchanger 5, and the air (outside air) sent by the outdoor air-sending fan 5f, and the condensation heat of the refrigerant is rejected to the sent air. This operation causes the refrigerant entering the outdoor heat exchanger 5 to be condensed into high-pressure liquid refrigerant. The high-pressure liquid refrigerant enters the pressure reducing device 6 where its pressure is reduced, causing the refrigerant to turn into low-pressure, two-phase refrigerant. The low-pressure, two-phase refrigerant enters the indoor heat exchanger 7 of the indoor unit 1 via the extension pipe 10b. In cooling operation, the indoor heat exchanger 7 acts as an evaporator. That is, in the indoor heat exchanger 7, heat is exchanged between the refrigerant circulated in the indoor heat exchanger 7, and the air (indoor air) sent by the indoor air-sending fan 7f, and the evaporation heat of the refrigerant is removed from the sent air. This operation causes the refrigerant entering the indoor heat exchanger 7 to be evaporated into low-pressure gas refrigerant or two-phase refrigerant. The air sent by the indoor air-sending fan 7f is cooled as the refrigerant removes heat. The low-pressure gas refrigerant or two-phase refrigerant evaporated in the indoor heat exchanger 7 is sucked into the compressor 3 via the extension pipe 10a and the refrigerant flow switching device 4. The refrigerant sucked into the compressor 3 is compressed into high-temperature, high-pressure gas refrigerant. The above cycle is repeated in cooling operation.

Next, heating operation will be described. In FIG. 1, dotted arrows indicate the flow of refrigerant in heating operation. In heating operation, the refrigerant circuit is configured so that the flow path of refrigerant is switched by the refrigerant flow switching device 4 as indicated by the dotted arrows, causing high-temperature, high-pressure refrigerant to flow to the indoor heat exchanger 7. In heating operation, the refrigerant flows in a direction opposite to that in cooling operation, with the indoor heat exchanger 7 acting as a condenser. That is, in the indoor heat exchanger 7, heat is exchanged between the refrigerant circulated in the indoor heat exchanger 7, and the air sent by the indoor air-sending fan 7f, and the condensation heat of the refrigerant is rejected to the sent air. The air sent by the indoor air-sending fan 7f is thus heated as the refrigerant rejects heat.

Figure 2:
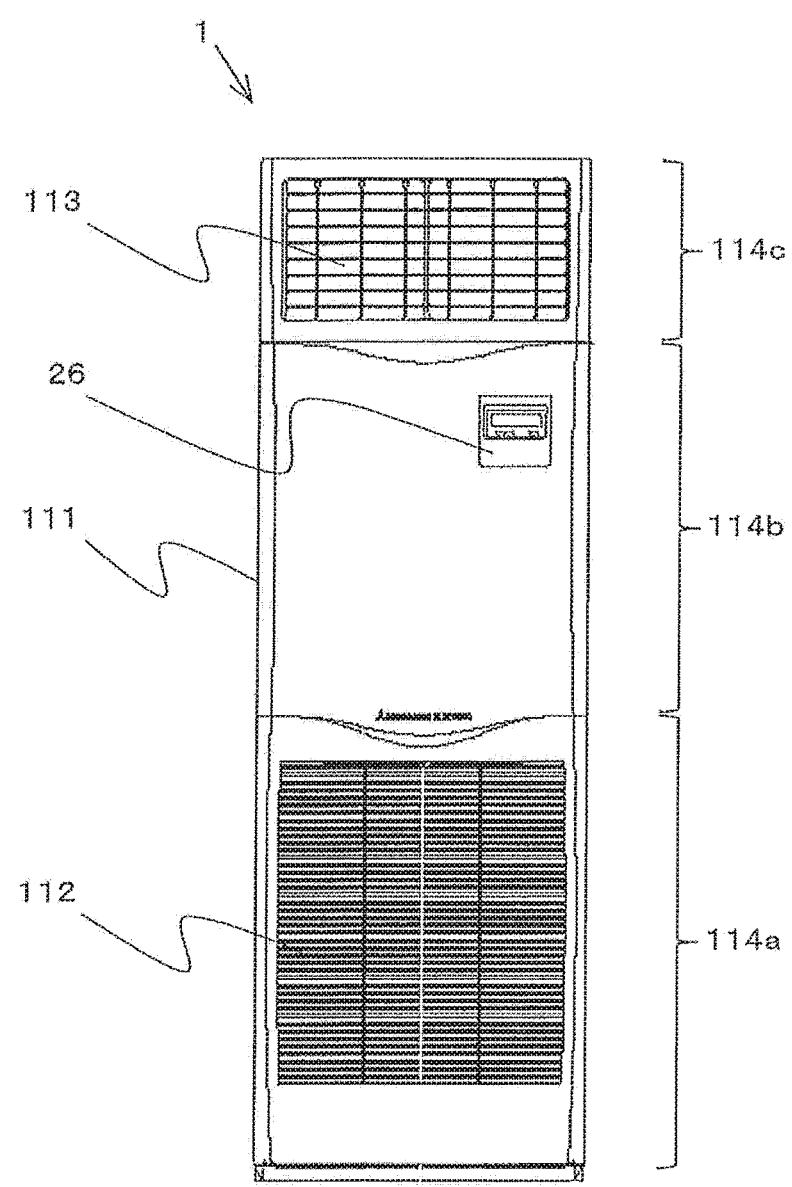
FIG. 2 is a front view illustrating the exterior configuration of an indoor unit 1 of the air-conditioning apparatus according to Embodiment 1 of the present invention.
Figure 3:
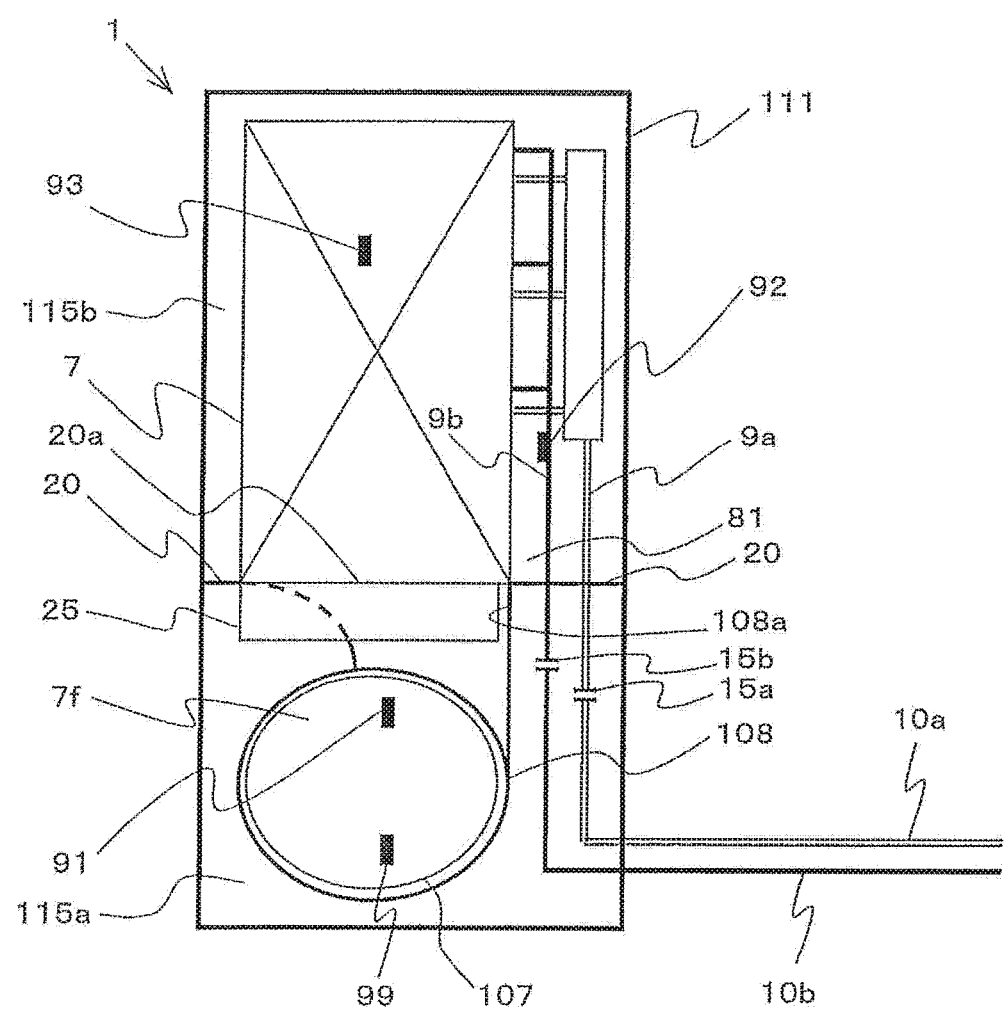
FIG. 3 is a front view schematically illustrating the internal structure of the indoor unit 1 of the air-conditioning apparatus according to Embodiment 1 of the present invention.
Figure 4:
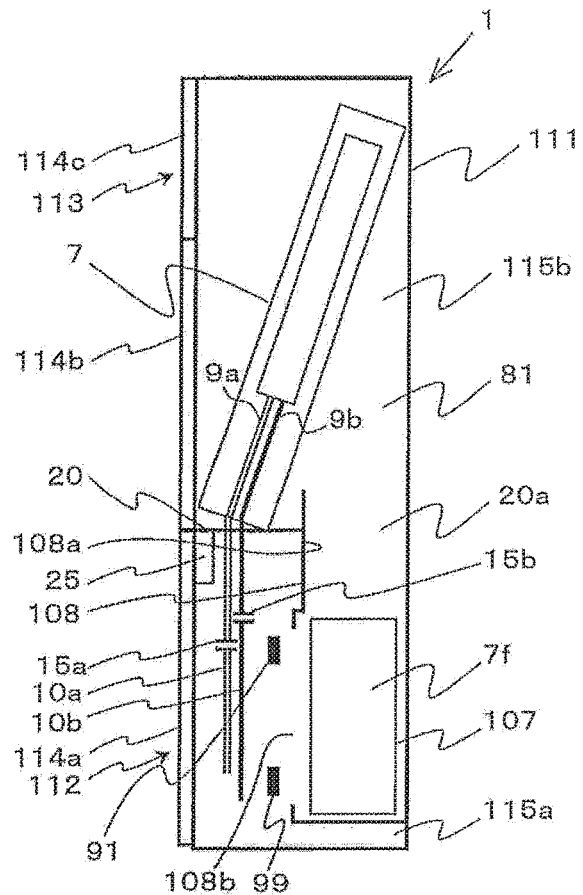
FIG. 4 is a side view schematically illustrating the internal structure of the indoor unit 1 of the air-conditioning apparatus according to Embodiment 1 of the present invention.

FIG. 2 is a front view illustrating the exterior configuration of the indoor unit 1 of the air-conditioning apparatus according to Embodiment 1. FIG. 3 is a front view illustrating the internal structure of the indoor unit 1 (with front panels removed). FIG. 4 is a side view illustrating the internal structure of the indoor unit 1. The left-hand side in FIG. 4 indicates the front side (indoor-space side) of the indoor unit 1. In Embodiment 1, the indoor unit 1 is illustrated to be of a floor-standing type installed on the floor surface of the indoor space that is the air-conditioned space. As a general rule, the relative positions of components (for example, their relative vertical arrangement) in the following description will be based on those when the indoor unit 1 is installed in a usable state.

As illustrated in FIGS. 2 to 4, the indoor unit 1 includes a housing 111 with a vertically elongated rectangular parallelepiped shape. An air inlet 112 for sucking in the air of the indoor space is provided in a lower part of the front face of the housing 111. The air inlet 112 in the present example is located at a position below the vertically central part of the housing 111 and in the vicinity of the floor surface. An air outlet 113 for blowing out the air sucked in through the air inlet 112 is provided in an upper part of the front face of the housing 111, that is, at a position higher than the air inlet 112 (for example, above the vertically central part of the housing 111). The operating unit 26 is provided at a position on the front face of the housing 111 above the air inlet 112 and below the air outlet 113. The operating unit 26 is connected to the control unit 30 via a communication line, allowing data to be mutually communicated between the operating unit 26 and the control unit 30. As described above, the operating unit 26 is operated by the user to perform functions such as starting and ending the operation of the indoor unit 1 (air-conditioning apparatus), switching operation modes, and setting a preset temperature and a preset air volume. The operating unit 26 may be provided with components such as a display unit and a voice output unit to provide information to the user.

The housing 111 is in the form of a hollow box with a front opening provided on the front face of the housing 111. The housing 111 includes a first front panel 114a, a second front panel 114b, and a third front panel 114c that are detachably attached over the front opening. Each of the first front panel 114a, the second front panel 114b, and the third front panel 114c has a substantially rectangular, flat plate shape. The first front panel 114a is detachably attached over a lower part of the front opening of the housing 111. The first front panel 114a is provided with the air inlet 112. The second front panel 114b is disposed above and adjacent to the first front panel 114a, and detachably attached over the vertically central part of the front opening of the housing 111. The second front panel 114b is provided with the operating unit 26. The third front panel 114c is disposed above and adjacent to the second front panel 114b, and detachably attached over an upper part of the front opening of the housing 111. The third front panel 114c is provided with the air outlet 113.

The internal space of the housing 111 is roughly divided into a space 115a serving as an air-sending part, and a space 115b located above the space 115a and serving as a heat exchange part. The space 115a and the space 115b are partitioned off by a partition plate 20 with a flat shape that is disposed substantially horizontally. The partition plate 20 is provided with at least an air passage opening 20a serving as an air passage between the space 115a and the space 115b. The space 115a is exposed to the front side when the first front panel 114a is detached from the housing 111, and the space 115b is exposed to the front side when the second front panel 114b and the third front panel 114c are detached from the housing 111. That is, the partition plate 20 is placed at substantially the same height as the height of the upper end of the first front panel 114a (or the lower end of the second front panel 114b).

The indoor air-sending fan 7f is disposed in the space 115a to create a flow of air that travels toward the air outlet 113 from the air inlet 112. The indoor air-sending fan 7f in the present example is a sirocco fan including a motor (not illustrated), and an impeller 107 connected to the output shaft of the motor and having a plurality of blades arranged circumferentially at equal intervals. The rotating axis of the impeller 107 (the output shaft of the motor) is disposed substantially in parallel to the direction of the depth of the housing 111. The impeller 107 of the indoor air-sending fan 7f is covered by a fan casing 108 having a spiral shape. The fan casing 108 is formed, for example, as a component separate from the housing 111. An air inlet opening 108b for sucking in the indoor air through the air inlet 112 is provided in the vicinity of the center of the spiral of the fan casing 108. The air inlet opening 108b is located opposite to the air inlet 112. Further, an air outlet opening 108a for blowing out the air to be sent is located in the direction of the tangent to the spiral of the fan casing 108. The air outlet opening 108a is oriented upward, and connected to the space 115b via the air passage opening 20a of the partition plate 20. In other words, the air outlet opening 108a communicates with the space 115b via the air passage opening 20a. The open end of the air outlet opening 108a and the open end of the air passage opening 20a may be directly connected with each other, or may be indirectly connected with each other via a component such as a duct member.

An electrical component box 25 for accommodating components such as various electrical components, a board, and a microcomputer constituting, for example, the control unit 30 are provided in the space 115a.

The indoor heat exchanger 7 is disposed in an air passage 81 in the space 115b. A drain pan (not illustrated) is provided below the indoor heat exchanger 7 to receive water condensed on the surface of the indoor heat exchanger 7. The drain pan may be formed as a part of the partition plate 20, or may be formed as a component separate from the partition plate 20 and disposed on the partition plate 20.

The refrigerant detection unit 99 is disposed close to a lower part of the area in the vicinity of the air inlet opening 108b. The refrigerant detection unit 99 detects, for example, the concentration of refrigerant in the air around the refrigerant detection unit 99, and outputs the resulting detection signal to the control unit 30. The control unit 30 determines whether refrigerant leaks based on the detection signal from the refrigerant detection unit 99.

In the indoor unit 1, refrigerant may leak at the brazed joints in the indoor heat exchanger 7, and the couplings 15a and 15b. Further, the refrigerant used in Embodiment 1 has a density greater than the density of air under atmospheric pressure. Thus, the refrigerant detection unit 99 according to Embodiment 1 is located at a position in the housing 111 below the indoor heat exchanger 7 and the couplings 15a and 15b. This configuration ensures that the refrigerant detection unit 99 is able to detect leaked refrigerant at least when the indoor air-sending fan 7f is stopped. Although the refrigerant detection unit 99 is disposed close to a lower part of the area in the vicinity of the air inlet opening 108b in Embodiment 1, the refrigerant detection unit 99 may be placed at a different position.

Figure 5:
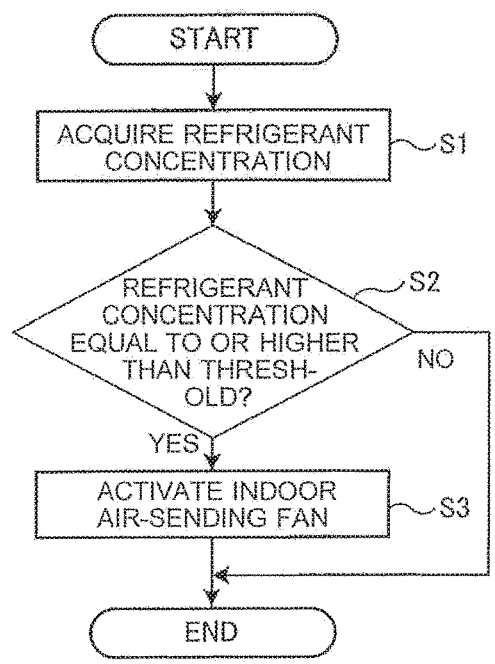
FIG. 5 is a flowchart illustrating an example of a refrigerant leak detection process executed by a control unit 30 in the air-conditioning apparatus according to Embodiment 1 of the present invention.

FIG. 5 is a flowchart illustrating an example of a refrigerant leak detection process executed by the control unit 30. This refrigerant leak detection process is repeatedly executed at predetermined time intervals either at all time, that is, both time when the air-conditioning apparatus is operating and time when the air-conditioning apparatus is stopped, or only at a time when the air-conditioning apparatus is stopped.

In step S1 illustrated in FIG. 5, the control unit 30 acquires, based on a detection signal from the refrigerant detection unit 99, information on the concentration of refrigerant in the vicinity of the refrigerant detection unit 99.

Next, in step S2, whether the concentration of refrigerant in the vicinity of the refrigerant detection unit 99 is equal to or higher than a preset threshold is determined. When the refrigerant concentration is determined to be equal to or higher than the threshold, the process proceeds to step S3. When the refrigerant concentration is determined to be less than the threshold, the process is ended.

In step S3, the operation of the indoor air-sending fan 7f is started. When the indoor air-sending fan 7f is already operating, the operation is continued as it is. In step S3, components such as a display unit and a voice output unit provided in the operating unit 26 may be used to inform the user that refrigerant leaks.

As described above, in the refrigerant leak detection process, the operation of the indoor air-sending fan 7f is started when a refrigerant leak is detected (that is, when the refrigerant concentration detected by the refrigerant detection unit 99 is equal to or higher than a threshold). As a result, the indoor air is sucked in to the air inlet 112, and the sucked indoor air is blown out from the air outlet 113. This operation allows the leaked refrigerant to be dispersed into the indoor space, thus preventing locally increased refrigerant concentrations in the indoor space.

Figure 6:
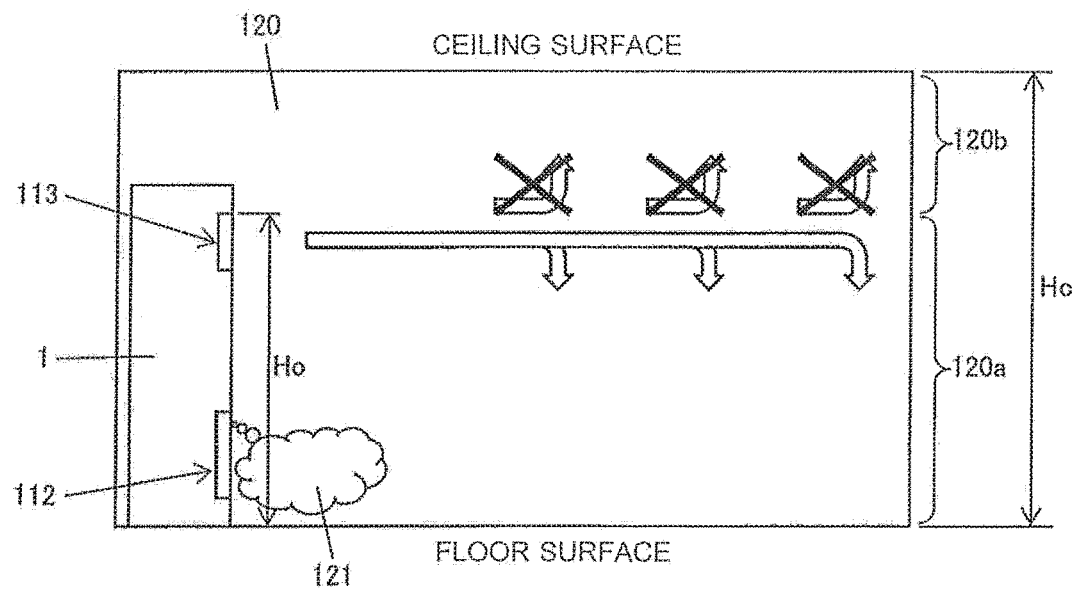
FIG. 6 illustrates the state of an indoor space 120 after operation of an indoor air-sending fan 7f is started through the process of step S3 illustrated in FIG. 5 in the air-conditioning apparatus according to Embodiment 1 of the present invention.

FIG. 6 illustrates the state of an indoor space 120 after operation of the indoor air-sending fan 7f is started through the process of step S3 illustrated in FIG. 5. As illustrated in FIG. 6, the air outlet 113 is located below the ceiling surface. Thus, the height Ho of the upper end of the air outlet 113 above the floor surface is lower than the height Hc of the ceiling surface above the floor surface (Ho<Hc). At this time, refrigerant leakage is assumed to still continues.

Embodiment 1 uses a refrigerant with a density greater than the density of air under atmospheric pressure. Thus, leaked refrigerant gas 121 of a relatively high concentration accumulates on the floor surface in the vicinity of the indoor unit 1 in the indoor space 120. As the indoor air-sending fan 7f is started to operate, the leaked refrigerant gas 121 is sucked in to the air inlet 112 as a refrigerant-air mixture in which refrigerant and air are mixed together. The sucked refrigerant-air mixture is blown out into the indoor space 120 through the air outlet 113 as indicated by thick arrows in FIG. 6. The direction in which the refrigerant-air mixture is blown out is, for example, horizontal. That is, while leakage of refrigerant continues, the following sequence of operations is repeated continuously: a refrigerant-air mixture containing a relatively high concentration of refrigerant is sucked in to the air inlet 112, and then blown out into the indoor space 120 at the height Ho through the air outlet 113.

The refrigerant contained in the refrigerant-air mixture blown out at the height Ho has a density greater than the density of air under atmospheric pressure. Thus, almost no refrigerant is dispersed to the space above the height Ho, and as the refrigerant flows downward, the refrigerant is dispersed to the lower space. Thus, while leakage of refrigerant continues, the leaked refrigerant is gradually dispersed to a lower space 120a that is a space in the indoor space 120 located at a height equal to or below the height Ho.

After leakage of refrigerant ends, the refrigerant-air mixture sucked in to the air inlet 112 gradually decreases in refrigerant concentration, and the refrigerant-air mixture blown out from the air outlet 113 also gradually decreases in refrigerant concentration. This operation reduces the difference between the density of the refrigerant-air mixture blown out at the height Ho, and the density of air. As a result, the refrigerant contained in the refrigerant-air mixture also begins to be dispersed to the space above the height Ho. That is, after leakage of refrigerant ends, the refrigerant is gradually dispersed also to an upper space 120b that is a space in the indoor space 120 located above the height Ho and below the height Hc.

Hereinafter, the above-mentioned phenomenon will be described more specifically with reference to experimental results.

Figure 7:
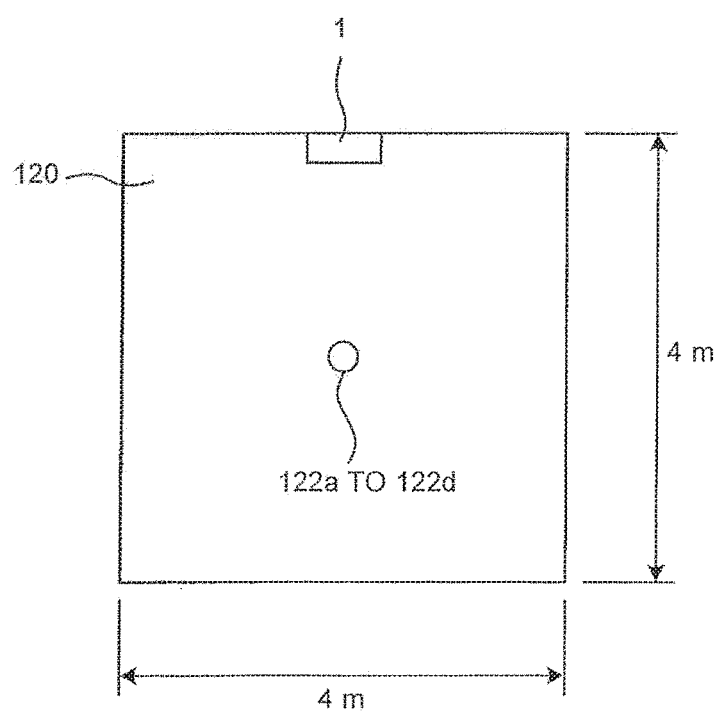
FIG. 7 is a plan view illustrating the configuration of the indoor space 120 used in an experiment related to Embodiment 1 of the present invention.

FIG. 7 is a plan view illustrating the configuration of the indoor space 120 used in an experiment. As illustrated in FIG. 7, the indoor space 120 is an enclosed space whose planar shape is a square of 4 m×4 m. The height Hc of the ceiling surface of the indoor space 120 is 2.5 m. That is, the indoor space 120 has a volume of 40 m³. The indoor unit 1 is disposed on the floor surface along the laterally central part of one wall surface in the indoor space 120. The height Ho of the air outlet 113 of the indoor unit 1 is 1.5 m. R-32 is used as the refrigerant. The lower flammable limit (LFL) of R-32 is 0.306 kg/m³ (=14.4 vol %). The indoor air-sending fan 7f is set to start operating when the concentration of refrigerant detected by the refrigerant detection unit 99 in the indoor unit 1 (in the housing 111) increases to 3.6 vol % (that is, ¼ of the LFL).

Four refrigerant concentration sensors 122a, 122b, 122c, and 122d used for refrigerant concentration measurement are disposed at different heights in the central part of the indoor space 120. The refrigerant concentration sensors 122a, 122b, 122c, and 122d are respectively located at heights of 0.5 m, 1.0 m, 1.5 m, and 2.0 m above the floor surface. That is, the refrigerant concentration sensors 122a, 122b, and 122c measure the concentrations of refrigerant in the lower space 120a located at a height equal to or below the height Ho. Of these sensors, the refrigerant concentration sensor 122c measures the concentration of refrigerant at the same height as the height Ho of the air outlet 113. The refrigerant concentration sensor 122d measures the concentration of refrigerant at a height in the upper space 120b above the height Ho.

In a first experiment, refrigerant was leaked at a leak rate of 10 kg/h in the housing 111 of the indoor unit 1, and the concentration of the refrigerant was measured by each of the four refrigerant concentration sensors 122a, 122b, 122c, and 122d. The total amount of refrigerant leaked was set to 12.24 kg. This total amount of refrigerant corresponds to the LFL for the volume of the indoor space 120. That is, the total amount of refrigerant is set so that the concentration of refrigerant reaches the LFL when the refrigerant is dispersed uniformly throughout the entire indoor space 120.

Figure 8:
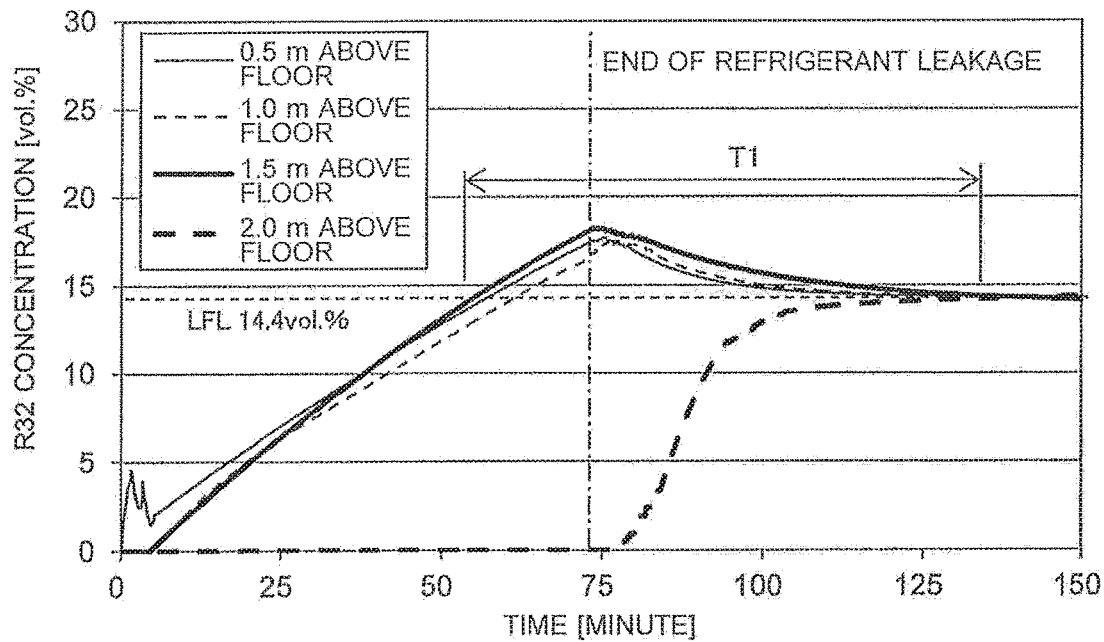
FIG. 8 is a graph illustrating changes in refrigerant concentration over time in a first experiment related to Embodiment 1 of the present invention.

FIG. 8 is a graph illustrating changes in refrigerant concentration over time in the first experiment. The horizontal axis of the graph represents time elapsed [minute] since the start of refrigerant leakage, and the vertical axis represents refrigerant (R-32) concentration [vol %]. The thin solid curved line in the graph represents changes in refrigerant concentration measured at a height of 0.5 m by the refrigerant concentration sensor 122a. The thin dashed curved line represents changes in refrigerant concentration measured at a height of 1.0 m by the refrigerant concentration sensor 122b. The thick solid curved line represents changes in refrigerant concentration measured at a height of 1.5 m by the refrigerant concentration sensor 122c. The thick dashed curved line represents changes in refrigerant concentration measured at a height of 2.0 m by the refrigerant concentration sensor 122d.

As illustrated in FIG. 8, the refrigerant concentrations measured by the refrigerant concentration sensors 122a, 122b, and 122c increase monotonously over time generally in the time period between the start and end of refrigerant leakage (between the 0th minute and approximately the 75th minute), and eventually exceeds the LFL. Then, after the end of refrigerant leakage, these refrigerant concentrations gradually decrease, eventually approaching the LFL. These refrigerant concentrations are above the LFL in a time period T1 between approximately the 60th minute and approximately the 130th minute of the elapsed time. This result indicates that a flammable concentration region is formed in the lower space 120a in the time period T1. The refrigerant concentrations measured by the refrigerant concentration sensors 122a, 122b, and 122c exhibit substantially identical values irrespective of the elapsed time. This result indicates substantially uniform dispersion of leaked refrigerant in the lower space 120a.

Meanwhile, the refrigerant concentration measured by the refrigerant concentration sensor 122d remains substantially 0 vol % in the time period between the start and end of refrigerant leakage. Although this refrigerant concentration starts to increase after the end of refrigerant leakage, the refrigerant concentration never exceeds the LFL, and eventually approaches the LFL. This result indicates that almost no refrigerant disperses to the upper space 120b until the end of refrigerant leakage, and such dispersion begins after the end of refrigerant leakage.

Figure 9:
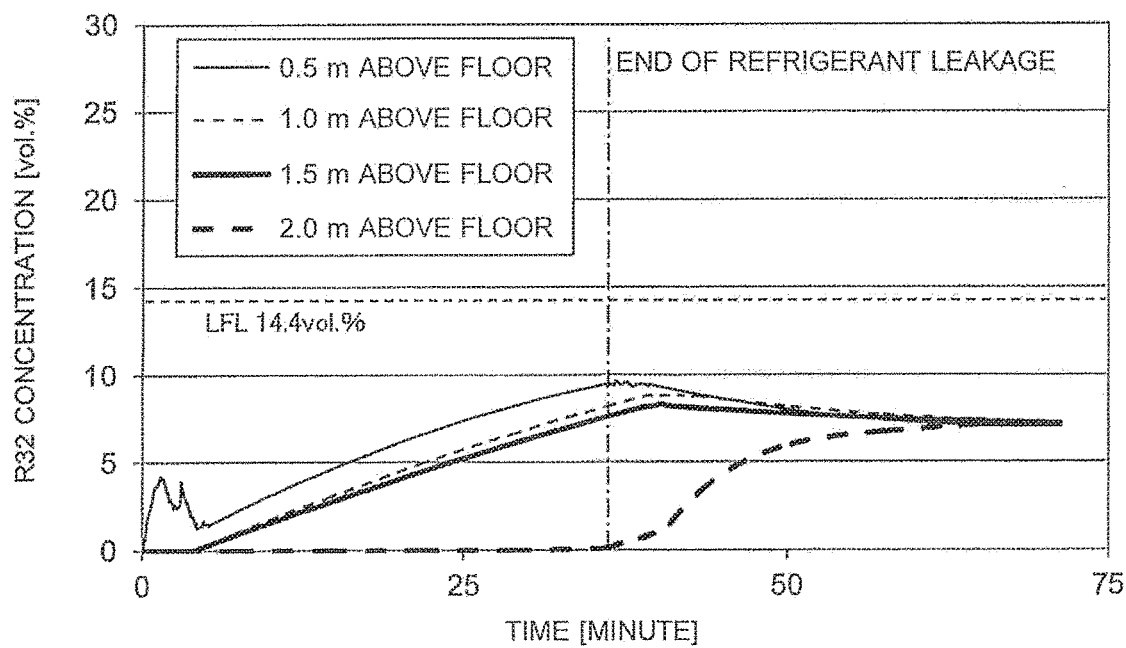
FIG. 9 is a graph illustrating changes in refrigerant concentration over time in a second experiment related to Embodiment 1 of the present invention.

In a second experiment, the total amount of refrigerant was set to 6.12 kg (half of that in the first experiment). FIG. 9 is a graph illustrating changes in refrigerant concentration over time in the second experiment. As illustrated in FIG. 9, the changes in refrigerant concentration in the second experiment exhibit a tendency similar to that of the first experiment.

As in the first experiment, the refrigerant concentrations measured by the refrigerant concentration sensors 122a, 122b, and 122c increase monotonously over time generally in the time period between the start and end of refrigerant leakage (between the 0th minute and approximately the 35th minute), but does not reach the LFL. Then, after the end of refrigerant leakage, these refrigerant concentrations gradually decrease, eventually approaching 7.2 vol % (½ of the LFL). Due to the small total amount of refrigerant in the second experiment, no time period existed in which the refrigerant concentration exceeds the LFL.

As in the first experiment, the refrigerant concentration measured by the refrigerant concentration sensor 122d remains substantially 0 vol % in the time period between the start and end of refrigerant leakage. This refrigerant concentration starts to increase after the end of refrigerant leakage, eventually approaching 7.2 vol % (½ of the LFL).

The following findings can be derived from the phenomenon described above with reference to FIG. 6, and the experimental results described above with reference to FIGS. 7 to 9.

(1) When the total amount of refrigerant is set equal to or greater than the amount corresponding to the LFL for the entire volume of the indoor space 120, a flammable concentration region may be formed in the lower space 120a.

(2) To prevent formation of a flammable concentration region in the lower space 120a, the total amount of refrigerant needs to be set less than the amount corresponding to the LFL for the volume of the lower space 120a.

The entire volume of the indoor space 120 is expressed by the product of the floor area of the indoor space 120, and the height Hc of the ceiling surface above the floor surface of the indoor space 120. The volume of the lower space 120a is expressed by the product of the floor area of the indoor space 120, and the height Ho at which the air outlet 113 is located above the floor surface of the indoor space 120 in a state in which the indoor unit 1 is placed in the indoor space 120. Values such as the floor area of the indoor space 120, the height Hc of the ceiling surface, and the height Ho of the air outlet 113 can not only be determined by the actual dimensions of the indoor space 120 in which the indoor unit 1 is actually placed but can also be determined or estimated from the specifications of the air-conditioning apparatus or the indoor unit 1 (catalog specifications).

For example, the floor area can be determined by the applicable floor area specified by the specifications of the air-conditioning apparatus or the indoor unit 1. The applicable floor area specified by the specifications of the air-conditioning apparatus or the indoor unit 1 is written in documents such as the catalog, installation manual, and delivery specifications sheet of the air-conditioning apparatus by using expressions such as "Approximate Air-conditioned Area" and "Approximate Room Size". Alternatively, the applicable floor area specified by the specifications of the air-conditioning apparatus or the indoor unit 1 can be determined by dividing the cooling capacity or heating capacity of the air-conditioning apparatus including the indoor unit 1 and the outdoor unit 2 by the cooling load or heating load used as a calculation criterion. The cooling capacity or heating capacity is written in, for example, the nameplate, catalog, or delivery specifications sheet of the indoor unit 1 or the outdoor unit 2 as rated capacity or maximum capacity. If both rated capacity and maximum capacity are written, maximum capacity is used. The cooling load or heating load used as the calculation criterion is written in the catalog, the installation manual, the delivery specifications sheet, or other documents.

FIG. 13 illustrates an example of items written in the catalog. As illustrated in FIG. 13, if, for example, the maximum cooling capacity of the air-conditioning apparatus is 5.0 kW, and the cooling load used as the calculation criterion for the indoor space in which the indoor unit 1 is installed is in the range of 170 W/m$^2$ to 115 W/m$^2$ (the cooling load used as the calculation criterion for general offices is used as an example here), the applicable floor area is determined to be in the range of 29 m$^2$ to 43 m$^2$.

When the indoor unit 1 is of a floor-standing type, the indoor unit 1 is installed on the floor surface. Thus, for the indoor unit 1 of a floor-standing type, the height Ho of the air outlet 113 above the floor surface corresponds to the height dimension of the indoor unit 1 from its bottom surface (for example, the surface in contact with the floor surface) to the air outlet 113. The height dimension of the indoor unit 1 from the bottom surface to the air outlet 113 can be determined based on the dimensions of various parts of the indoor unit 1 written in the catalog, the delivery specifications sheet, or other documents. Alternatively, the height dimension of the indoor unit 1 from the bottom surface to the air outlet 113 can be also determined by actual measurement.

When the indoor unit 1 used is of a type (for example, a wall-mounted type) other than a floor-standing type, the indoor unit 1 is installed at a predetermined installation height above the floor surface. Thus, the height Ho of the air outlet 113 of the indoor unit 1 above the floor surface can be determined by the sum of the height dimension of the indoor unit 1 from the bottom surface to the air outlet 113, and the installation height of the indoor unit 1 above the floor surface (that is, the height dimension from the floor surface to the bottom surface of the indoor unit 1). The height dimension of the indoor unit 1 from the bottom surface to the air outlet 113 can be determined based on the dimensions of various parts of the indoor unit 1 written in the catalog, the delivery specifications sheet, or other documents. Alternatively, the height dimension of the indoor unit 1 from the bottom surface to the air outlet 113 can be also determined by actual measurement. The installation height of the indoor unit 1 above the floor surface is written in the catalog, the installation manual, the delivery specifications sheet, or other documents. For example, if the height dimension of the indoor unit 1 from the bottom surface to the air outlet 113 is 10 cm, and the installation height of the indoor unit 1 above the floor surface is 180 cm, the height Ho of the air outlet 113 above the floor surface is determined to be 190 cm.

The lower flammable limit LFL can be determined by the type of refrigerant. The type of refrigerant is written in, for example, the nameplate of the outdoor unit 2, the catalog, the installation manual, or the delivery specifications sheet. The lower flammable limit LFL for each individual type of refrigerant is written in literature such as the international standard IEC 60335-2-40.

The amount of refrigerant charge, M, can be determined by the sum of refrigerant charged at the factory, and the amount of refrigerant added on-site as needed depending on the length of refrigerant pipes. The amount of refrigerant charged at the factory is written in, for example, the nameplate of the outdoor unit 2, the catalog, the installation manual, or the delivery specifications sheet. The amount of refrigerant added on-site depending on the length of refrigerant pipes is written in the catalog, the installation manual, or other documents.

FIG. 14 illustrates an example of items written in the catalog or the installation manual. In the example illustrated in FIG. 14, such items include the type of refrigerant, the amount of refrigerant charge at factory, and the amount of refrigerant added for refrigerant pipe lengths over 30 m.

The catalog and the delivery specifications sheet, which are documents used during business negotiations, are distributed to the public and can be also obtained from websites. Further, the installation manual is packaged with at least one of the indoor unit 1 and the outdoor unit 2, and can be also obtained from websites. The nameplate is attached on the indoor unit 1 and the outdoor unit 2.

As described above, the air-conditioning apparatus according to Embodiment 1 includes the refrigeration cycle 40 through which refrigerant is circulated, the indoor unit 1 that accommodates at least the indoor heat exchanger 7 of the refrigeration cycle 40, the indoor unit 1 being disposed in the indoor space 120, and the control unit 30 that controls the indoor unit 1. The refrigerant is a flammable refrigerant with a density greater than the density of air under atmospheric pressure. The indoor unit 1 includes the indoor air-sending fan 7f, the air inlet 112 through which the air of the indoor space 120 is sucked in, and the air outlet 113 located above the air inlet 112 and through which the air sucked in through the air inlet 112 is blown out to the indoor space 120. The air outlet 113 is provided on the front face or the side face (the front face in the present example) of the housing 111 of the indoor unit 1. The control unit 30 activates the indoor air-sending fan 7f when leakage of the refrigerant is detected. When M [kg] represents the amount of charge of the refrigerant in the refrigeration cycle 40, LFL [kg/m$^3$] represents the lower flammable limit of the refrigerant, A [m$^2$] represents the floor area of the indoor space 120, and Ho [m] represents the height of the air outlet 113 above the floor surface of the indoor space 120, the amount of charge M, the lower flammable limit LFL, the floor area A, and the height Ho satisfy the relationship of M<LFL× A×Ho.

This configuration ensures that even if the entire amount of refrigerant charged in the refrigeration cycle 40 leaks to the indoor space 120, the refrigerant concentration in the lower space 120a does not increase to the LFL. Consequently, formation of a flammable concentration region in the indoor space 120 can be reduced.

For the air-conditioning apparatus according to Embodiment 1, the floor area mentioned above may be the applicable floor area specified by the specifications of the air-conditioning apparatus or the indoor unit 1.

Both to reduce formation of a flammable concentration region and to ensure sufficient air-conditioning capacity of the air-conditioning apparatus to the indoor space 120, the amount of charge M, the lower flammable limit LFL, the floor area A, and the height Ho may be made to satisfy the relationship of $S \times LFL \times A \times Ho \leq M < LFL \times A \times Ho$, where S denotes a coefficient greater than 0 and less than 1 (0<S<1). The coefficient S is a value that varies with factors such as the range of air conditions (for example, the range of outside air temperatures) set in advance in implementing the air-conditioning apparatus, the maximum length of the extension pipe, the specifications of the heat exchanger used in the air-conditioning apparatus, and the type of refrigerant. Depending on the case, the coefficient S may have a value of about 1/10, or may have a value of about 1/100 or less.

Embodiment 2

An air-conditioning apparatus according to Embodiment 2 of the present invention will be described. In the air-conditioning apparatus according to Embodiment 2, the amount of refrigerant charge M, the lower flammable limit LFL of the refrigerant, the floor area A of the indoor space 120, and the height Ho of the air outlet 113 satisfy the relationship of $M \geq LFL \times A \times Ho$.

Figure 10:
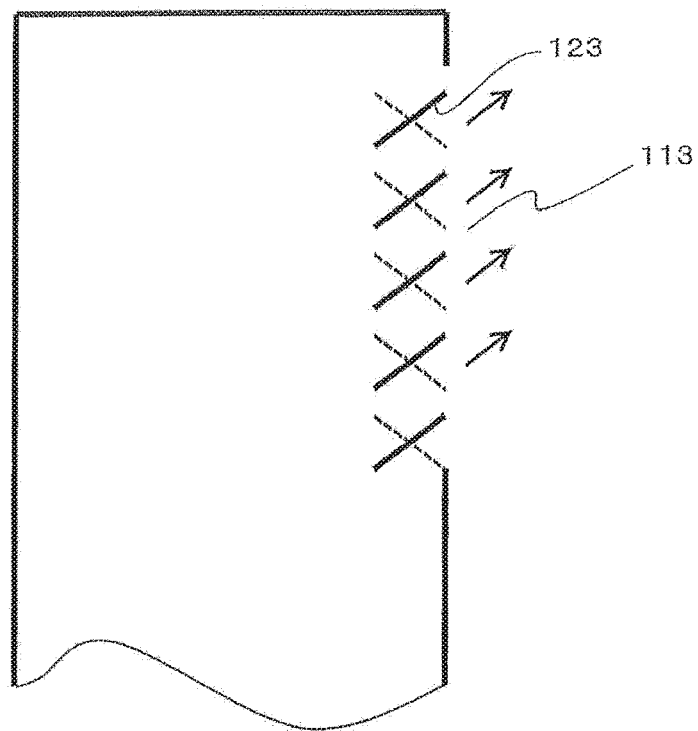
FIG. 10 is a cross-sectional view illustrating the configuration in the vicinity area of an air outlet 113 of the indoor unit 1 of an air-conditioning apparatus according to Embodiment 2 of the present invention.

FIG. 10 is a cross-sectional view illustrating the configuration in the vicinity area of the air outlet 113 of the indoor unit 1 of the air-conditioning apparatus according to Embodiment 2. The configuration of the indoor unit 1 in areas other than the vicinity of the air outlet 113 is the same as that of the indoor unit 1 according to Embodiment 1, thus illustration and description of the configuration in these areas will be omitted.

As illustrated in FIG. 10, the indoor unit 1 according to Embodiment 2 has, at the air outlet 113, a single or a plurality of (five in the present example) vertical air deflector vanes 123. The vertical air deflector vanes 123 are capable of rotating about the rotation axis provided in the horizontal direction, between an angular position oriented diagonally downward as indicated by dashed lines in FIG. 10 and an angular position oriented diagonally upward as indicated by solid lines in FIG. 10. With the vertical air deflector vanes 123 set in the downward angular position, air is blown out downward from the air outlet 113. With the vertical air deflector vanes 123 set in the upward angular position, air is blown out upward (as indicated by arrows in FIG. 10) from the air outlet 113. The vertical air deflector vanes 123 are controlled by the control unit 30 so that the vertical air deflector vanes 123 are driven to rotate by a drive mechanism (not illustrated).

Figure 11:
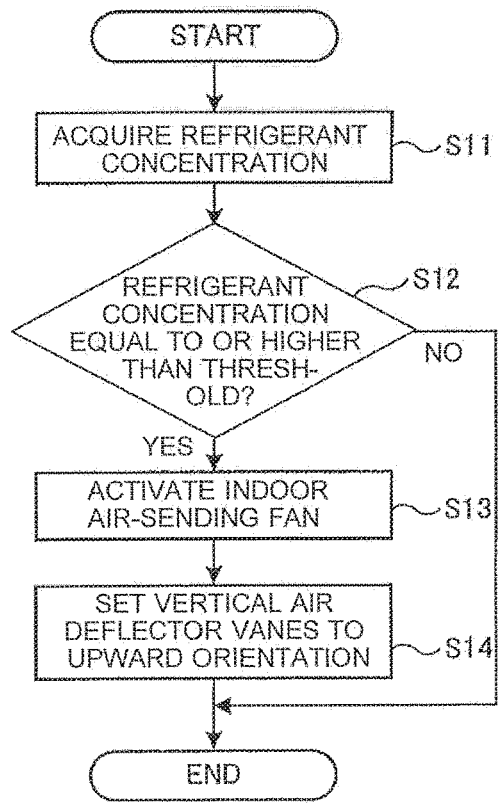
FIG. 11 is a flowchart illustrating an example of a refrigerant leakage detection process executed by the control unit 30 in the air-conditioning apparatus according to Embodiment 2 of the present invention.

FIG. 11 is a flowchart illustrating an example of a refrigerant leak detection process executed by the control unit 30. This refrigerant leak detection process is repeatedly executed at predetermined time intervals at all times, that is, both time when the air-conditioning apparatus is operating and time when the air-conditioning apparatus is stopped, or only at a time when the air-conditioning apparatus is stopped. Step S11 to S13 are the same as steps S1 to S3 illustrated in FIG. 5.

As illustrated in FIG. 11, when the concentration of refrigerant is determined to be equal to or higher than a threshold, step S14 is executed in addition to S13 that is the same as S3. At step S14, the vertical air deflector vanes 123 are set to be oriented more upward than the horizontal plane. The ideal angle of the vertical air deflector vanes 123 at this time is 45 degrees to the horizontal plane. This ideal angle causes air to be blown out upward (toward the upper space 120b) from the air outlet 113. Step S13 may be executed after S14 is executed.

Figure 12:
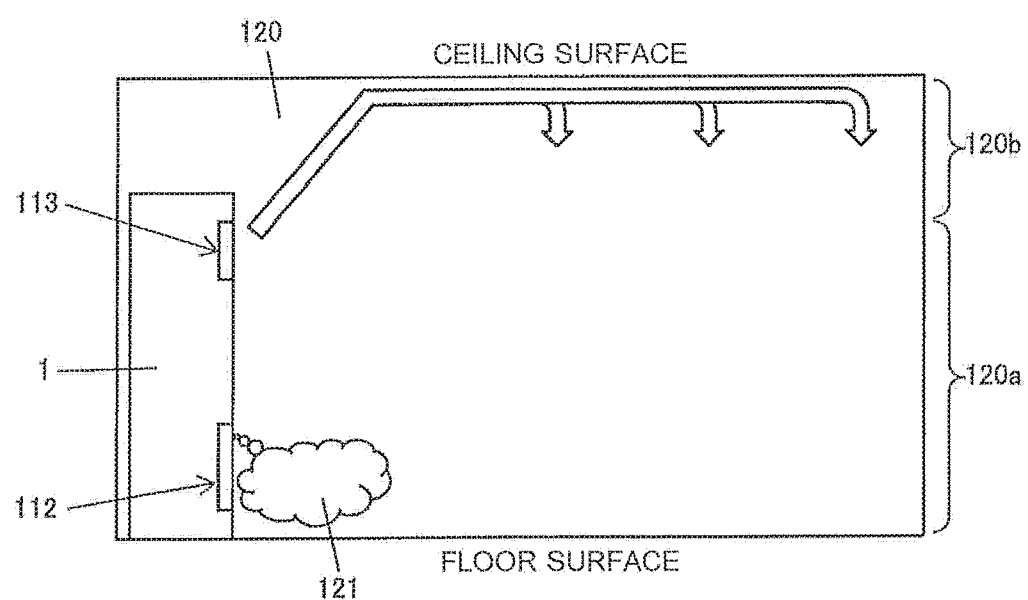
FIG. 12 illustrates the state of the indoor space 120 after operation of the indoor air-sending fan 7f is started through the process of step S14 illustrated in FIG. 11 in the air-conditioning apparatus according to Embodiment 2 of the present invention.

FIG. 12 illustrates the state of the indoor space 120 after the vertical air deflector vanes 123 are set to be oriented upward through the process of step S14. As illustrated in FIG. 12, a refrigerant-air mixture is blown out upward from the air outlet 113. Thus, unlike the arrangement illustrated in FIG. 6, the refrigerant can be dispersed throughout the entire indoor space 120 including the upper space 120b from immediately after the start of refrigerant leakage. Consequently, Embodiment 2 reduces formation of a flammable concentration region in the indoor space 120 even when the amount of refrigerant charge is set equal to or greater than the amount corresponding to the LFL for the volume of the lower space 120a. The amount of refrigerant charge is preferable to be set less than the amount corresponding to the LFL for the entire volume of the indoor space 120.

As described above, the air-conditioning apparatus according to Embodiment 1 includes the refrigeration cycle 40 through which refrigerant is circulated, the indoor unit 1 that accommodates at least the indoor heat exchanger 7 of the refrigeration cycle 40, the indoor unit 1 being disposed in the indoor space 120, and the control unit 30 that controls the indoor unit 1. The refrigerant is a flammable refrigerant with a density greater than the density of air under atmospheric pressure. The indoor unit 1 includes the indoor air-sending fan 7f, the air inlet 112 through which the air of the indoor space 120 is sucked in, the air outlet 113 located above the air inlet 112 and through which the air sucked in through the air inlet 112 is blown out to the indoor space 120, and the vertical air deflector vanes 123 located at the air outlet 113. The air outlet 113 is provided on the front face or the side face of the housing 111 of the indoor unit 1. When M [kg] represents the amount of charge of the refrigerant in the refrigeration cycle 40, LFL [kg/m³] represents the lower flammable limit of the refrigerant, A [m²] represents the floor area of the indoor space 120, and Ho [m] represents the height of the air outlet 113 above the floor surface of the indoor space 120, the amount of charge M, the lower flammable limit LFL, the floor area A, and the height Ho satisfy the relationship of $M \geq LFL \times A \times Ho$. The control unit 30 activates the indoor air-sending fan 7f and sets the vertical air deflector vanes 123 to an upward orientation when leakage of the refrigerant is detected.

This configuration allows leaked refrigerant to be dispersed not only to the lower space 120a but also to the upper space 120b. Consequently, formation of a flammable concentration region in the indoor space 120 can be reduced even when the amount of refrigerant charge is set equal to or greater than the amount corresponding to the LFL for the volume of the lower space 120a.

Further, in the air-conditioning apparatus according to Embodiment 2, when Hc [m] represents the height of the ceiling surface above the floor surface of the indoor space 120, the amount of charge M, the lower flammable limit LFL, the floor area A, and the height Hc may satisfy the relationship of $M < LFL \times A \times Hc$.

This configuration reduces formation of a flammable concentration region in the indoor space 120 even if the entire amount of refrigerant charged in the refrigeration cycle 40 leaks to the indoor space 120.

In the air-conditioning apparatus according to Embodiment 2, the floor area mentioned above may be the applicable floor area specified by the specifications of the air-conditioning apparatus or the indoor unit 1.

Other Embodiments

The present invention is not limited to the above embodiments but capable of various modifications.

For example, although the air outlet 113 and the air inlet 112 are provided on the front face of the housing 111 of the indoor unit 1 in the embodiments mentioned above, the air outlet 113 and the air inlet 112 may be provided on the side face of the housing 111.

Although the above-mentioned embodiments are directed to the indoor unit 1 that is of a floor-standing type, the present invention is also applicable to any other type of indoor unit (for example, a wall-mounted indoor unit) placed so that the height Ho of the air outlet is lower than the height Hc of the ceiling surface.

REFERENCE SIGNS LIST 1 indoor unit 2 outdoor unit 3 compressor 4 refrigerant flow switching device 5 outdoor heat exchanger 5f outdoor air-sending fan 6 pressure reducing device 7 indoor heat exchanger 7f indoor air-sending fan 9a, 9b indoor pipe 10a, 10b extension pipe 11 suction pipe 12 discharge pipe 13a, 13b extension-pipe connection valve 14a, 14b, 14c service port 15a, 15b coupling 20 partition plate 20a air passage opening 25 electrical component box 26 operating unit 30 control unit 40 refrigeration cycle 81 air passage 91 suction air temperature sensor 92 heat exchanger inlet temperature sensor 93 heat exchanger temperature sensor 99 refrigerant detection unit 107 impeller 108 fan casing 108a air outlet opening 108b air inlet opening 111 housing 112 air inlet 113 air outlet 114a first front panel 114b second front panel 114c third front panel 115a, 115b space 120 indoor space 120a lower space 120b upper space 121 leaked refrigerant gas 122a, 122b, 122c, 122d refrigerant concentration sensor 123 vertical air deflector vane

The invention claimed is:

1. A refrigerant amount setting method of an air-conditioning apparatus,
    the air-conditioning apparatus including
    a refrigeration cycle through which refrigerant is circulated,
    an indoor unit accommodating at least an indoor heat exchanger of the refrigeration cycle, the indoor unit being disposed in an indoor space, and
    a controller configured to control the indoor unit,
    the refrigerant being a flammable refrigerant with a density greater than a density of air under atmospheric pressure,
    the indoor unit including an air-sending fan, and an air outlet through which air is blown out to the indoor space, and
    the controller being configured to activate the air-sending fan when leakage of the refrigerant is detected,
    wherein the refrigerant amount setting method of the air-conditioning apparatus comprises:
    when M [kg] represents an amount of charge of the refrigerant in the refrigeration cycle, LFL [kg/m$^3$] represents a lower flammable limit of the refrigerant, A [m$^2$] represents a floor area of the indoor space, and Ho [m] represents a height of the air outlet above a floor surface of the indoor space, determining the amount of charge M so that the amount of charge M, the lower flammable limit LFL, the floor area A, and the height Ho to satisfy a relationship of M<LFL×A×Ho, and
    setting the amount of charge of the air conditioning apparatus to be the amount of charge M using the relationship M<LFL×A×Ho.

2. A refrigerant amount setting method of an air-conditioning apparatus,
    the air-conditioning apparatus including
    a refrigeration cycle through which refrigerant is circulated,
    an indoor unit accommodating at least an indoor heat exchanger of the refrigeration cycle, the indoor unit being disposed in an indoor space, and
    a controller configured to control the indoor unit,
    the refrigerant being a flammable refrigerant with a density greater than a density of air under atmospheric pressure,
    the indoor unit including an air-sending fan, and an air outlet through which air is blown out upward to the indoor space,
    the controller being configured to activate the air-sending fan when leakage of the refrigerant is detected,
    wherein the refrigerant amount setting method of the air-conditioning apparatus comprises:
    when M [kg] represents an amount of charge of the refrigerant in the refrigeration cycle, LFL [kg/m$^3$] represents a lower flammable limit of the refrigerant, A [m$^2$] represents a floor area of the indoor space, Ho [m] represents a height of the air outlet above a floor surface of the indoor space, and Hc [m] represents a height of a ceiling surface above the floor surface of the indoor space, determining the amount of charge M so that the amount of charge M, the lower flammable limit LFL, the floor area A, the height Ho, and the height Hc to satisfy a relationship of LFL×A×Ho≤M<LFL×A×Hc, and
    setting the amount of charge of the air conditioning apparatus to be the amount of charge M using the relationship LFL×A×Ho≤M<LFL×A×Hc.

* * * * *